(12) United States Patent
Kim

(10) Patent No.: US 10,541,548 B2
(45) Date of Patent: Jan. 21, 2020

(54) BATTERY PACK AND ENERGY STORAGE SYSTEM INCLUDING THE BATTERY PACK

(71) Applicant: SAMSUNG SDI CO., LTD., Yongin-si, Gyeonggi-do (KR)

(72) Inventor: Taejin Kim, Yongin-si (KR)

(73) Assignee: Samsung SDI Co., Ltd., Yongin-si (KR)

( * ) Notice: Subject to any disclaimer, the term of this patent is extended or adjusted under 35 U.S.C. 154(b) by 120 days.

(21) Appl. No.: 15/230,345

(22) Filed: Aug. 5, 2016

(65) Prior Publication Data

US 2017/0047759 A1 Feb. 16, 2017

(30) Foreign Application Priority Data

Aug. 13, 2015 (KR) ........................ 10-2015-0114554

(51) Int. Cl.
*H02J 7/00* (2006.01)
(52) U.S. Cl.
CPC ................................. *H02J 7/0068* (2013.01)
(58) Field of Classification Search
USPC .......................................................... 320/118
See application file for complete search history.

(56) References Cited

U.S. PATENT DOCUMENTS

| 2007/0139006 A1* | 6/2007 | Yasuhito | H01M 10/441 320/116 |
| 2009/0295335 A1* | 12/2009 | Yang | H01M 10/441 320/134 |
| 2010/0019732 A1* | 1/2010 | Utsumi | H01M 10/4207 320/136 |
| 2010/0327806 A1* | 12/2010 | Brisebois | G01R 31/3658 320/116 |
| 2012/0086404 A1* | 4/2012 | Lim | H02J 3/28 320/128 |
| 2013/0106173 A1* | 5/2013 | Nomura | H01M 10/443 307/9.1 |
| 2014/0018990 A1* | 1/2014 | Kataoka | B60L 11/1851 701/22 |
| 2014/0035365 A1* | 2/2014 | Yoo | H02J 7/007 307/18 |
| 2014/0091769 A1* | 4/2014 | Kim | H02J 7/04 320/134 |
| 2014/0115191 A1* | 4/2014 | Kim | G06F 13/42 710/4 |
| 2014/0285024 A1 | 9/2014 | Cheng et al. | |
| 2015/0162763 A1* | 6/2015 | Kimura | H02J 7/0031 320/107 |
| 2017/0033575 A1* | 2/2017 | Kaji | H02J 7/0029 |

FOREIGN PATENT DOCUMENTS

| KR | 10-2012-0086283 A | 8/2012 |
| KR | 10-2013-0102404 A | 9/2013 |
| KR | 10-2014-0020659 A | 2/2014 |

* cited by examiner

*Primary Examiner* — Samuel Berhanu
(74) *Attorney, Agent, or Firm* — Lewis Roca Rothgerber Christie LLP

(57) ABSTRACT

A battery pack includes: a battery including at least one battery cell; a power line communicator connected to a current path to detect a first data signal; and a battery management system (BMS) to receive the first data signal from the power line communicator, and to control the battery according to the first data signal.

15 Claims, 5 Drawing Sheets

BATTERY PACK AND ENERGY STORAGE SYSTEM INCLUDING THE BATTERY PACK

CROSS-REFERENCE TO RELATED PATENT APPLICATION

This application claims priority to and the benefit of Korean Patent Application No. 10-2015-0114554, filed on Aug. 13, 2015, in the Korean Intellectual Property Office, the disclosure of which is incorporated herein in its entirety by reference.

BACKGROUND

1. Field

One or more aspects of exemplary embodiments relate to battery packs and energy storage systems (ESSs) including the battery packs.

2. Description of the Related Art

Energy storage systems (ESSs) are storage devices that store energy like a battery, so that users can use the stored energy at any desired time. Since electrical energy has a difference between production and storage, electrical energy usually needs to be used as it is being produced. However, since ESSs efficiently store and use energy, the ESSs may enable energy production to be performed without having to be used as it is produced.

Accordingly, when an ESS is utilized, the ESS may store energy that is produced when a relatively small amount of energy is consumed (e.g., during non-peak times, such as at dawn), may effectively use the stored energy when energy supply is concentrated (e.g., during peak times), and may increase an energy production operation rate.

The ESS may include a battery, and a battery management system (BMS) to monitor the state of the battery and to control the battery. To communicate with a power system, the ESS may use wired communication techniques, such as RS485, RS422, and/or RS232.

The above information disclosed in this Background section is for enhancement of understanding of the background of the present invention, and therefore, it may contain information that does not constitute prior art.

SUMMARY

One or more exemplary embodiments are directed toward a battery pack capable of power line communication, and an ESS including the battery pack, and more particularly, to a battery pack capable of communication between battery cells without special communication cables, and an ESS including the battery pack.

Additional aspects and features will be set forth in part in the description which follows, and in part, will be apparent from the description, or may be learned by practice of the presented embodiments.

According to one or more exemplary embodiments, a battery pack includes: a battery including at least one battery cell; a power line communicator connected to a current path to detect a first data signal; and a battery management system (BMS) configured to receive the first data signal from the power line communicator, and to control the battery according to the first data signal.

The first data signal may include: a signal corresponding to a location of the battery; and a control signal for the battery.

The battery may be connected to the power line communicator in parallel via the current path.

The BMS may be configured to communicate with the power line communicator via a Serial Peripheral Interface (SPI).

The first data signal may flow along the current path via the battery.

The BMS may be configured to monitor a state of the battery, and to transmit information corresponding to the state of the battery to the power line communicator.

The power line communicator may be configured to output, to the current path, a second data signal including the information corresponding to the state of the battery received from the BMS.

The information corresponding to the state of the battery may include information corresponding to a state of charge (SOC), a voltage, a current, and/or a temperature of the at least one battery cell.

According to one or more exemplary embodiments, an energy storage system (ESS) includes: a plurality of battery packs connected to each other in series; a master communicator configured to output a first data signal via a current path along the plurality of battery packs; and a controller configured to control the master communicator to output the first data signal, wherein each of the plurality of battery packs includes: a battery including at least one battery cell; a slave communicator connected to the current path to detect the first data signal; and a battery management system (BMS) configured to receive the first data signal from the slave communicator, and to control an operation of the battery according to the first data signal.

The first data signal may include: a signal corresponding to a location of the battery; and a control signal for the battery.

The battery may be connected to the slave communicator in parallel via the current path.

The BMS may be configured to communicate with the slave communicator via a Serial Peripheral Interface (SPI).

The first data signal may flow along the current path via the battery.

The BMS may be configured to monitor a state of the battery, and to transmit information corresponding to the state of the battery to the slave communicator.

The slave communicator may be configured to output, to the current path, a second data signal including the information corresponding to the state of the battery received from the BMS.

The master communicator may be configured to receive the second data signal, and to transmit the second data signal to the controller.

The information corresponding to the state of the battery may include information corresponding to a state of charge (SOC), a voltage, a current, and/or a temperature of the at least one battery cell.

BRIEF DESCRIPTION OF THE DRAWINGS

These and/or other aspects and features will become apparent and more readily appreciated from the following description of example embodiments of the present invention, taken in conjunction with the accompanying drawings in which.

DETAILED DESCRIPTION

Figure 1:
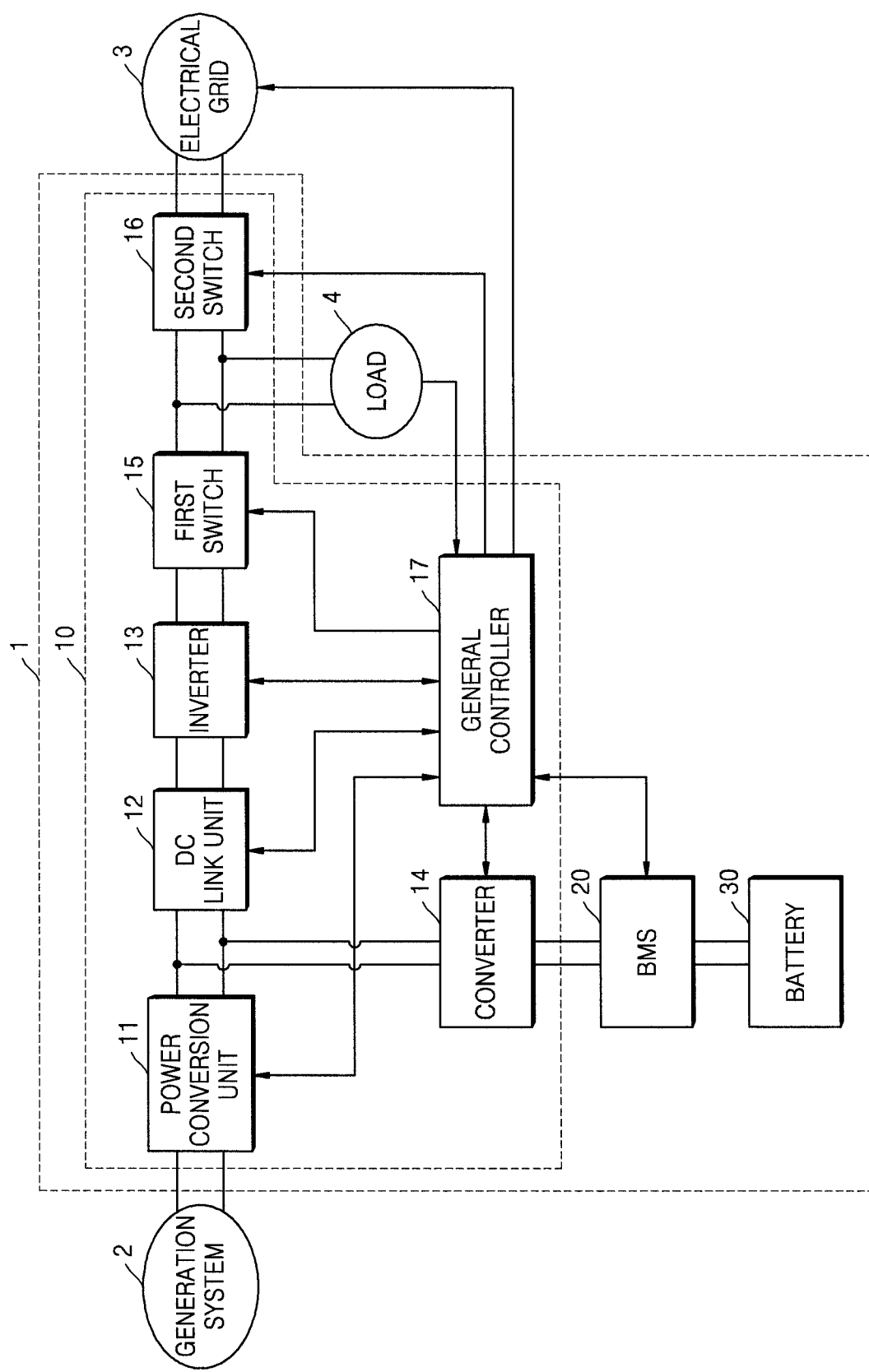
FIG. 1 illustrates a structure of an energy storage system (ESS)

Hereinafter, example embodiments will be described in more detail with reference to the accompanying drawings, in which like reference numbers refer to like elements throughout. The present invention, however, may be embodied in various different forms, and should not be construed as being limited to only the illustrated embodiments herein. Rather, these embodiments are provided as examples so that this disclosure will be thorough and complete, and will fully convey the aspects and features of the present invention to those skilled in the art. Accordingly, processes, elements, and techniques that are not necessary to those having ordinary skill in the art for a complete understanding of the aspects and features of the present invention may not be described. Unless otherwise noted, like reference numerals denote like elements throughout the attached drawings and the written description, and thus, descriptions thereof may not be repeated.

FIG. 1 illustrates a structure of an energy storage system (ESS) 1.

Referring to FIG. 1, the ESS 1 is linked with a power generation system 2 and an electrical grid 3, and provides electricity to a load 4.

The power generation system 2 generates electricity by using an energy source, and supplies the generated electricity to the ESS 1. The power generation system 2 may include, for example, at least one selected from a sunlight power generation system, a wind power generation system, and a tidal power generation system.

The electrical grid 3 may include, for example, power plants, substations, transmission lines, etc. The electrical grid 3 applies electricity to the ESS 1, so that the electricity may be supplied to the load 4 and/or a battery 30. The electrical grid 3 may receive electricity from the ESS 1.

The load 4 consumes electricity generated by the power generation system 2, electricity stored in the battery 30, and/or power supplied from the electrical grid 3. The load 4 may include, for example, a home and/or a factory.

Electricity generated by the power generation system 2 may be stored in the battery 30 and/or supplied to the electrical grid 3 by the ESS 1. The ESS 1 may supply electricity stored in the battery 30 to the electrical grid 3, and/or may store electricity from the electrical grid 3 in the battery 30. The ESS 1 may perform uninterruptible power supply (UPS) when the electrical grid 3 is not functioning properly (e.g., blacked out).

The ESS 1 includes a power conversion system (PCS) 10 for controlling power conversion, a battery management system (BMS) 20, and the battery 30.

The PCS 10 converts the power of the power generation system 2, the power of the electrical grid 3, and the power of the battery 30 into appropriate powers, and supplies the powers to where desired. The PCS 10 includes a power conversion unit (e.g., a power converter) 11, a direct current (DC) link unit (e.g., a DC link) 12, an inverter 13, a converter 14, a first switch 15, a second switch 16, and a general controller 17.

The power conversion unit 11 is connected between the power generation system 2 and the DC link unit 12. The power conversion unit 11 transmits electricity generated by the power generation system 2 to the DC link unit 12. Thus, the power conversion unit 11 converts an output voltage thereof to a DC link voltage.

According to the type (e.g., kind) of the power generation system 2, the power conversion unit 11 may include, for example, a converter circuit or a rectifier circuit. If the power generation system 2 generates DC electricity, the power conversion unit 11 may include a converter to convert AC electricity to DC electricity. If the power generation system 2 generates alternating current (AC) electricity, the power conversion unit 11 may include a rectifier circuit to convert AC electricity to DC electricity. For example, the power generation system 2 may include a solar power generation system. In this case, the power conversion unit 11 may include a maximum power point tracking (MPPT) converter to maximally receive electricity from the power generation system 2 according to various factors, such as an amount of solar radiation and/or temperature.

The DC link unit 12 is connected between the power conversion unit 11 and the inverter 13. The DC link unit 12 prevents or substantially prevents an instantaneous voltage drop in the power generation system 2 and/or the electrical grid 3, and prevents or substantially prevents an event of a peak load in the load 4, and thus, the level of the DC link voltage may be stable.

The inverter 13 is a power converter that is connected between the DC link unit 12 and the first switch 15. The inverter 13 converts a DC link voltage provided by at least one of the power generation system 2 and the battery 30 to an AC voltage of the electrical grid 3 and outputs the AC voltage. To store electricity of the electrical grid 3 in the battery 30 during a charging mode, the inverter 13 may include a rectifier circuit that rectifies the AC voltage of the electrical grid 3, converts the rectified AC voltage to a DC link voltage, and outputs the DC link voltage. The inverter 13 may be a bidirectional inverter for which an input direction and an output direction may change.

The inverter 13 may include, for example, a filter for removing harmonic waves from the AC voltage that is output to the electrical grid 3, and a phase locked loop (PLL) circuit for synchronizing a phase of an output AC voltage with a phase of the AC voltage of the electrical grid 3. The inverter 13 may perform various functions, such as restricting a voltage variation range, improving power-factor, removing a DC component, and protecting from a transient phenomenon. The inverter 13 may stop operating in order to reduce or minimize power consumption when the inverter 13 is not in use.

The converter 14 may be a power converter that is connected between the DC link unit 12 and the battery 30. The converter 14 converts power stored in the battery 30 during a discharge mode to a voltage level required by the inverter 13, for example, to a DC link voltage, and outputs the DC link voltage to the inverter 13. The converter 14 converts power output by the power conversion unit 11 and/or power output by the inverter 13 during a charge mode to a charge voltage level required by the battery 30, and outputs the charge voltage. In other words, the converter 14 may be a bidirectional converter for which directions of an input and an output may change. When the battery 30 is not charged or discharged, the converter 14 may stop operating to reduce or minimize power consumption.

The first switch 15 and the second switch 16 are serially connected between the inverter 13 and the electrical grid 3, and control a current flow between the power generation system 2 and the electrical grid 3 by being turned on or off under the control of the general controller 17. The first and second switches 15 and 16 may be turned on or off according to the states of the power generation system 2, the electrical grid 3, and the battery 30. For example, when a large amount of electricity is required by the load 4, both the first switch 15 and the second switch 16 are turned on, so that both of the powers of the power generation system 2 and the electrical grid 3 may be used. When the powers of the power generation system 2 and the electrical grid 3 cannot satisfy an electricity amount that is required by the load 4, electricity stored in the battery 30 may be provided to the load 4. On the other hand, when the electrical grid 3 is in a blackout state, the second switch 16 is turned off, and the first switch 15 is turned on. Accordingly, the power from the power generation system 2 and/or the battery 30 may be supplied to the load 4, but flow of the power toward the electrical grid 3, namely, during a single operation, may be prevented. Thus, a worker working on, for example, power lines of the electrical grid 3 may not be shocked, for example.

The general controller 17 monitors the states of the power generation system 2, the electrical grid 3, the battery 30, and the load 4, and controls the power conversion unit 11, the inverter 13, the converter 14, the first switch 15, the second switch 16, and the BMS 20 according to results of the monitoring. The states that are monitored by the general controller 17 may include, for example, generation or non-generation of a blackout in the electrical grid 3, and/or production or non-production of electricity by the power generation system 2. The general controller 17 may monitor, for example, a power production amount of the power generation system 2, a state of charge (SOC) of the battery 30, and/or a power consumption amount of the load 4.

The BMS 20 is connected to the battery 30 and controls charge and discharge operations of the battery 30 under the control of the general controller 17. The BMS 20 may perform an overcharge prevention function, an over-discharge prevention function, an over-current prevention function, an overvoltage prevention function, an overheating prevention function, and/or the like in order to protect the battery 30. To this end, the BMS 20 may monitor, for example, a voltage, a current, a temperature, a residual power amount, a lifespan, and/or a SOC of the battery 30, and may transmit a result of the monitoring to the general controller 17. The BMS 20 according to one or more embodiments of the present invention may estimate a SOC corresponding to a measured open circuit voltage (OCV).

The battery 30 receives and stores the power generated by the power generation system 2 and/or the power of the electrical grid 3, and supplies the stored power to the load 4 and/or the electrical grid 3.

The battery 30 may include at least one battery rack. When the battery 30 includes more than one battery rack, the battery racks may be connected to each other in series and/or in parallel. The battery rack is a lower component included in the battery 30. Each battery rack may include at least one battery tray, but when more than one battery tray is included, the battery trays may be connected to each other serially and/or in parallel. The battery tray is a lower component that is included in the battery rack. Each battery tray may include a plurality of battery cells. The battery 30 may be implemented with various types (e.g., kinds) of battery cells, and may include, for example, a nickel-cadmium battery, a nickel metal hydride (NiMH) battery, a lithium ion battery, and/or a lithium polymer battery.

Figure 2:
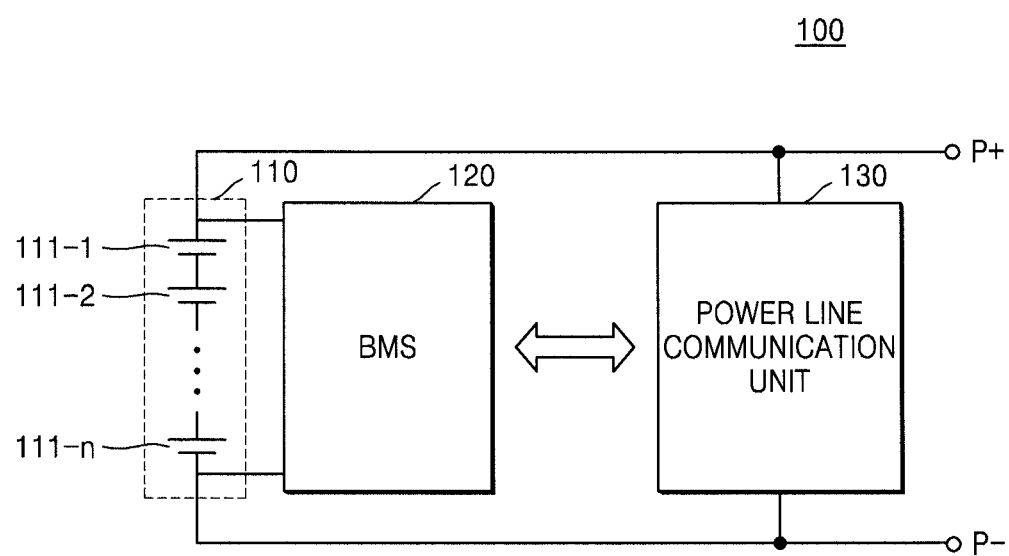
FIG. 2 is a block diagram of a battery pack according to an embodiment of the present invention.

FIG. 2 is a block diagram of a battery pack 100 according to an embodiment of the present invention.

Referring to FIG. 2, the battery pack 100 includes a battery 110, a BMS 120, and a power line communication unit (e.g., a power line communicator) 130. The battery pack 100 shown in FIG. 2 may include the BMS 20 and the battery 30 described above with reference to FIG. 1, and may be connected to an inverter, a converter, and/or the like to supply electricity to an electrical grid and/or a load, or to store power supplied from a power generation system and/or the electrical grid.

The battery 110 includes a plurality of battery cells 111-1 through 111-*n*. The battery cells 111-1 through 111-*n* are not limited to one type (e.g., kind), and as described above with reference to FIG. 1, the battery cells 111-1 through 111-*n* may include nickel-cadmium batteries, NiMH batteries, lithium ion batteries, lithium polymer batteries, and/or the like.

The BMS 120 receives a signal from the power line communication unit 130, and controls the battery 110 according to the received signal. The power line communication unit 130 is connected to a current path, and detects a first data signal. The signal received by the BMS 120 from the power line communication unit 130 may be the first data signal. The first data signal may include a signal corresponding to a location of the battery 110, and a control signal for the battery 110.

The BMS 120 may monitor the state of the battery 110, and may transmit information about the state of the battery 110 to the power line communication unit 130. The BMS 120 may measure a current, a voltage, and/or a temperature of the battery 110, calculate or estimate an SOC, a state of health, and/or the like of the battery 110 by using the measured current, voltage, and/or temperature, and predict a degradation degree, a residual lifespan, and/or the like of the battery 110 from the calculated or estimated SOC, state of health, and/or the like.

As shown in FIG. 2, the BMS 120 is connected to both electrodes of the battery 110, and is capable of measuring a current, a voltage, and/or a temperature of the battery 110. However, the present invention is not limited thereto. For example, according to another embodiment of the present invention, the BMS 120 may be connected to both electrodes of each of the battery cells 111-1 through 111-*n* included in the battery 110, and thus, may measure a current, a voltage, and/or a temperature of each of the battery cells 111-1 through 111-*n*.

Although a single battery 110 is illustrated in FIG. 2, the ESS may include a plurality of batteries that are connected to one another in series or in parallel. When a signal including a control signal for a specific battery is transmitted, the first data signal may include a signal or data indicating the location of the specific battery, which is to be controlled, in order to transmit the control signal to the specific battery.

The control signal for the battery 110 may be a signal for controlling a charging or discharging operation of the battery 110, and/or charging or discharging operations of the battery cells 111-1 through 111-*n* included in the battery 110. When the first data signal including the control signal for the battery 110 is received via the power line communication unit 130, the BMS 120 may control the charging or discharging operation of the battery 110 according to the first data signal.

According to some embodiments of the present invention, the battery cells 111-1 through 111-*n* may be connected to one another via switches, and the switches may control the charging or discharging operations of the battery cells 111-1 through 111-*n* via a switching operation controlled by the BMS 120.

The first data signal may flow along the current path via the battery 110. Thus, the first data signal flows through the plurality of battery cells 111-1 through 111-*n* included in the battery 110, and when a plurality of batteries are connected to one another, the first data signal may flow through the plurality of batteries.

However, even when the first data signal flows via a battery, the battery in which the first data signal flows is not directly controlled by the first data signal. The first data signal is detected by the power line communication unit 130, and the first data signal detected by the power line communication unit 130 is transmitted to the BMS 120.

The battery 110 and the power line communication unit 130 are connected to each other in parallel via the current path, and the BMS 120 and the power line communication unit 130 are connected to each other in parallel via the current path.

The BMS 120 and the power line communication unit 130 may communicate with each other via a Serial Peripheral Interface (SPI) technique. An SPI, which is a type (e.g., kind) of communication interface between components, may be simply constructed, may form an interactive protocol, and may connect a large number of nodes to one another.

The BMS 120 and the power line communication unit 130 may communicate with each other via the SPI technique, but the interface technique is not limited to the SPI technique. For example, the BMS 120 and the power line communication unit 130 may communicate with each other via any suitable communication interface technique including an Inter Interface Circuit (I2C) technique.

After monitoring the state of the battery 110, the BMS 120 may transmit a result of the monitoring to the power line communication unit 130. The power line communication unit 130 may generate a second data signal including information about the state of the battery 110, which is received from the BMS 120. The second data signal may be output by the power line communication unit 130 to the current path.

Figure 3:
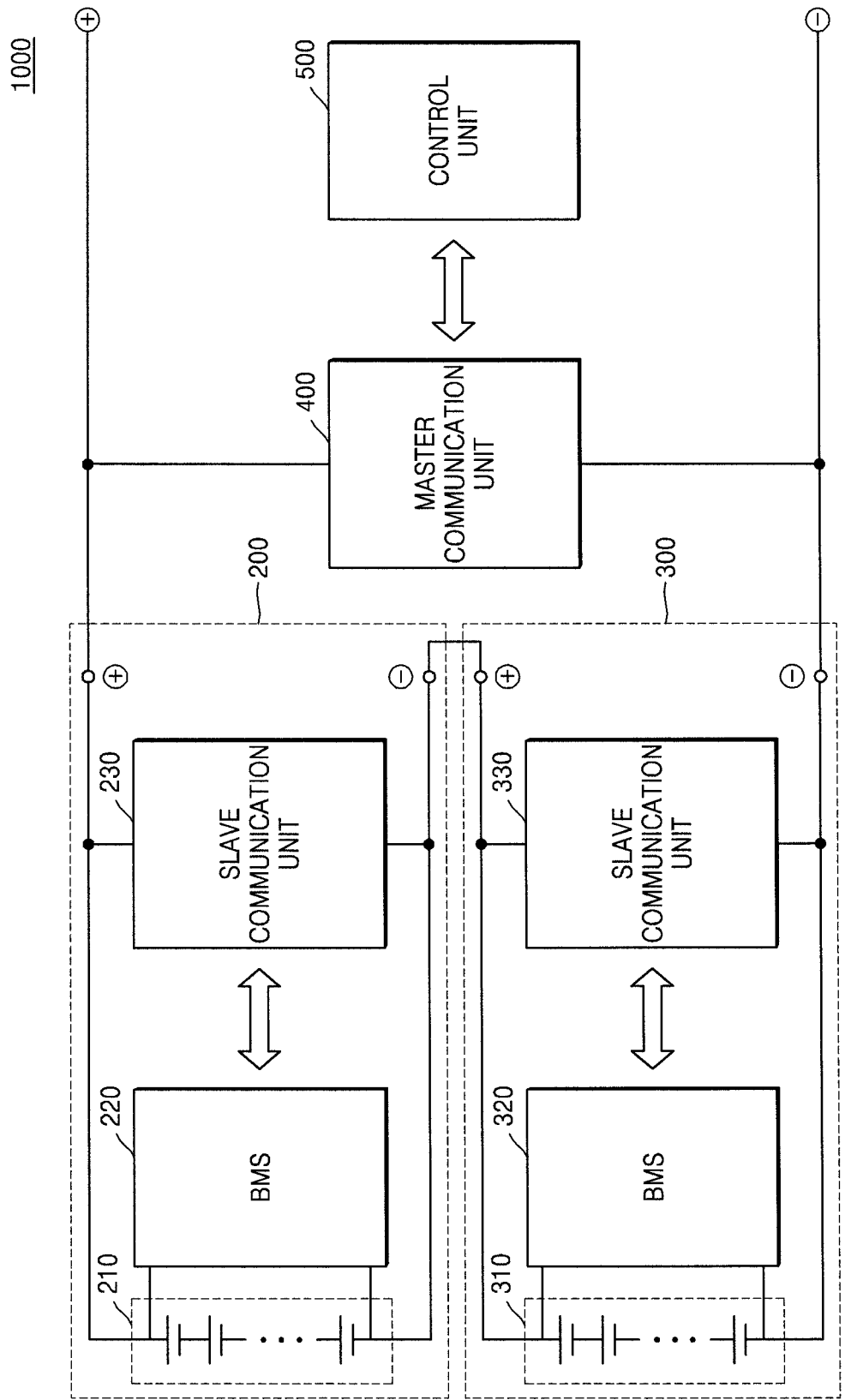
FIG. 3 is a block diagram of an ESS according to an embodiment of the present invention.

FIG. 3 is a block diagram of an ESS 1000 according to an embodiment of the present invention.

Referring to FIG. 3, the ESS 1000 includes a plurality of battery packs 200 and 300 connected in series to each other, a master communication unit (e.g., a master communicator) 400, and a control unit (e.g., a controller) 500. The master communication unit 400 outputs a first data signal via a current path that is formed along the plurality of battery packs 200 and 300. The control unit 500 controls the master communication unit 400 to output the first data signal.

In a first battery pack 200, a battery 210, a BMS 220, and a slave communication unit (e.g., a slave communicator) 230 may be connected to each other in parallel via the current path. In a second battery pack 300, a battery 310, a BMS 320, and a slave communication unit (e.g., a slave communicator) 330 may be connected to each other in parallel via the current path.

The plurality of battery packs 200 and 300 will now be respectively referred to as the first battery pack 200 and the second battery pack 300. The first battery pack 200 and the second battery pack 300 include the batteries 210 and 310, the slave communication units 230 and 330, and the BMSs 220 and 320, respectively.

Each of the batteries 210 and 310 includes at least one battery cell, and each of the slave communication units 230 and 330 is connected to the current path and detects the first data signal. The BMSs 220 and 320 receive the first data signal from the slave communication units 230 and 330, and control operations of the batteries 210 and 310 in response to the received first data signal.

The first data signal may include signals corresponding to locations of the batteries 210 and 310, and control signals for the batteries 210 and 310. Although the ESS 1000 including two battery packs, for example, the first battery pack 200 and the second battery pack 300, is illustrated in FIG. 3, the present invention is not limited to the structure of FIG. 3, and in some embodiments, ESS may include at least 3 battery packs.

In an ESS including a plurality of battery packs, each battery pack includes a battery, and the first data signal output by the master communication unit 400 may include information about a location of a control-target battery from among a plurality of batteries and a control signal for the control-target battery.

For example, when a first data signal output by the master communication unit 400 includes a control signal for the battery 310 of the second battery pack 300, the first data signal is transmitted to the second battery pack 300 via the battery 210 included in the first battery pack 200, and the slave communication unit 330 may detect a signal corresponding to the location of the battery 310 from the first data signal to determine that the detected signal is a data signal for the battery 310 of the second battery pack 300.

A signal corresponding to the location of each battery may be an identification (ID) number given to each battery. Since IDs respectively given to batteries are set to be different from each other, a control-target battery may be distinguished by referring to the IDs.

Accordingly, the slave communication unit 330 receives the control signal for the battery 310 included in the first data signal, and transmits the control signal to the BMS 320. In response to the control signal, the BMS 320 may control the battery 310 according to the control signal. The control of the battery 310 by the BMS 320 may be for charging, discharging, cell balancing, and/or the like.

The BMSs 220 and 320 monitor states of the batteries 210 and 310, and transmits results of the monitoring to the slave communication units 230 and 330, respectively. The slave communication units 230 and 330 may receive the results of the monitoring of the batteries 210 and 310, and may generate second data signals respectively including information about the states of the batteries 210 and 310.

The second data signals generated by the slave communication units 230 and 330 may be output to the current path and transmitted to the master communication unit 400. The second data signals may be transmitted to the control unit 500 via the master communication unit 400.

Through this process, the control unit 500 may determine the states of the plurality of batteries included in the plurality of battery packs 200 and 300, and may control outputting of the first data signal for controlling the plurality of batteries 200 and 300 according to the determined states of the batteries, a surrounding environment, and/or demands of the ESS 1000. The master communication unit 400 and the control unit 500 may communicate with each other according to the SPI technique described above with reference to FIG. 2.

Figure 4:
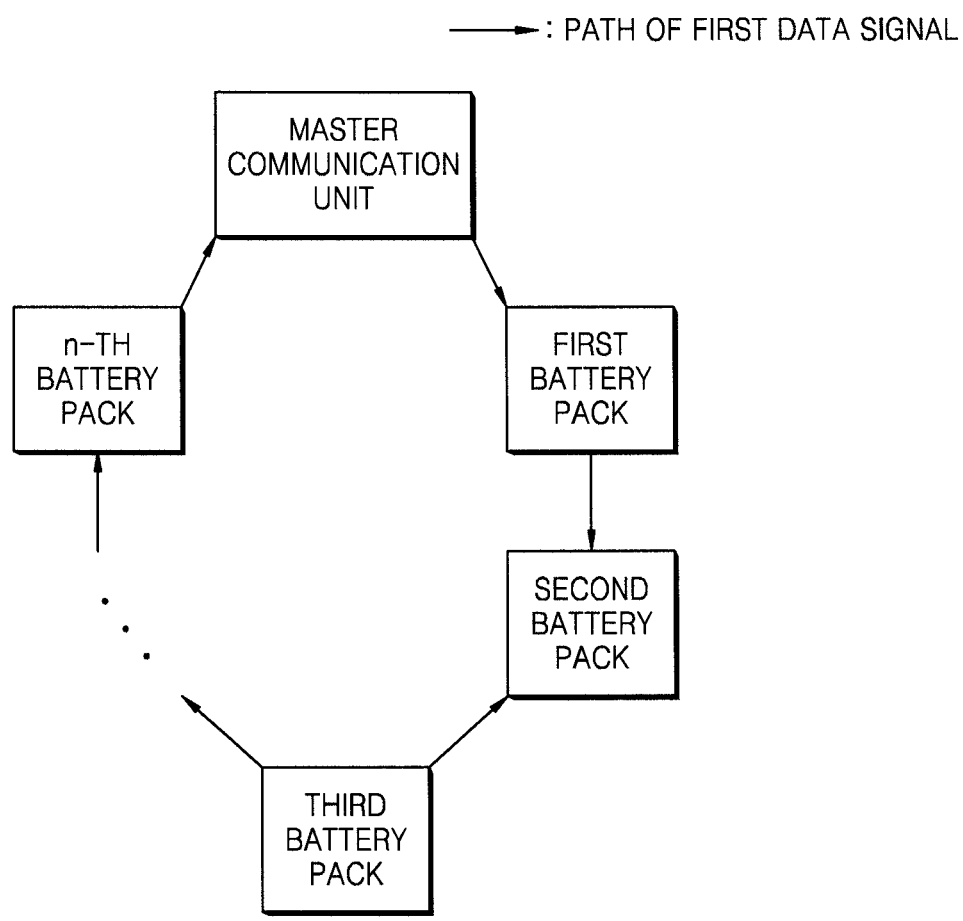
FIGS. 4 and 5 illustrate a data transmission path between battery packs according to an embodiment of the present invention.
Figure 5:
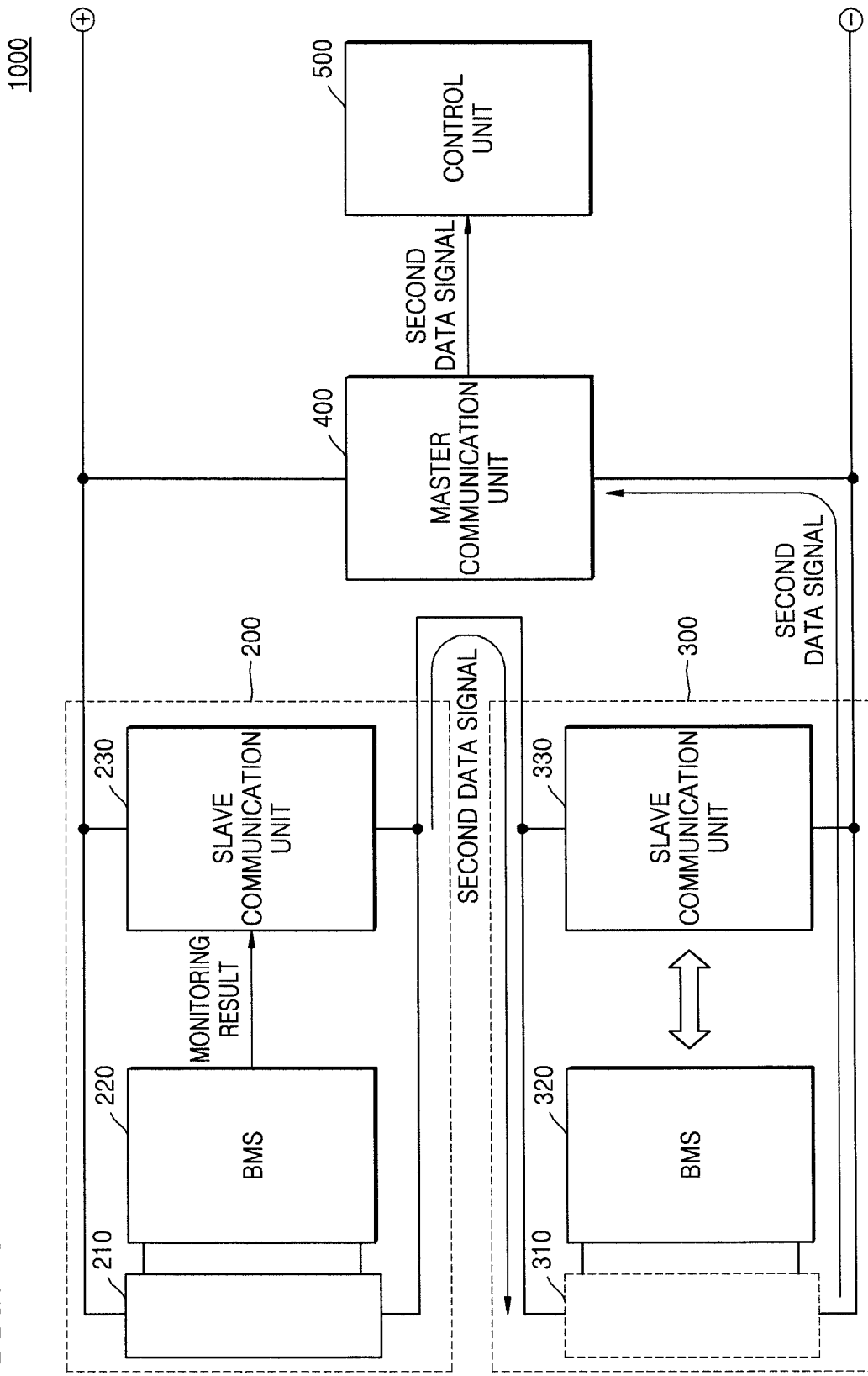

FIGS. 4 and 5 illustrate a data transmission path between battery packs according to an embodiment of the present invention.

A transmission path of a first data signal between battery packs according to an embodiment of the present invention may include a path starting from a master communication unit (e.g., a master communicator), and may sequentially pass through a plurality of battery packs.

The path of FIG. 4 may be a transmission path of a data signal in an ESS including at least two battery packs. Referring to FIG. 4, the first data signal output by the master communication unit flows along a path from a first battery pack to a second battery pack, from the second battery pack to a third battery pack, and so on to an n-th battery pack.

The first data signal includes a control signal for a battery included in a particular battery pack from among the plurality of battery packs, and may be irrelevant to the other battery packs. However, since a single current path serially connecting the plurality of battery packs to one another is included in a structure where the plurality of battery packs are connected in series to each other, the first data signal flows along the current path.

FIG. 5 illustrates a transmission path of a second data signal according to an embodiment of the present invention. FIG. 5 illustrates an ESS 1000 including two battery packs, similar to that shown in FIG. 3, and shows a transmission path of a second data signal output by the first battery pack 200.

Accordingly, FIG. 5 will now be described by focusing on an operation of the first battery pack 200. The BMS 220 monitors the state of the battery 210 and transmits a result of monitoring a current, a voltage, and/or a temperature of the battery 210 to the slave communication unit 230.

The slave communication unit 230 may generate a second data signal corresponding to the monitoring result received from the BMS 220, namely, information about the state of the battery 210. The slave communication unit 230 may output the second data signal via the current path.

The second data signal flows via the current path, and the master communication unit 400 receives the second data signal and transmits the received second data signal to the control unit 500. The second data signal output by the slave communication unit 230 flows via the current path and passes through the battery 310 included in the second battery pack 300. However, since the second data signal includes information that is irrelevant to the control of the battery 310 and/or the state of the battery 310, the battery 310 serves as a path allowing the second data signal to flow therethrough.

In a structure as shown in FIG. 5, a second data signal output by the slave communication unit 330 included in the second battery pack 300 also flows along the current path, but the second data signal may be transmitted to the master communication unit 400 and the control unit 500 without passing through the first battery pack 200.

One or more exemplary embodiments of the present invention include a battery pack capable of power line communication, and an ESS including the battery pack.

It will be understood that exemplary embodiments described herein should be considered in a descriptive sense only, and not for purposes of limitation. Descriptions of features or aspects within each exemplary embodiment may typically be considered as available for other similar features or aspects in other exemplary embodiments, unless expressly disclosed otherwise.

In the drawings, the relative sizes of elements, layers, and regions may be exaggerated for clarity. Spatially relative terms, such as "beneath," "below," "lower," "under," "above," "upper," and the like, may be used herein for ease of explanation to describe one element or feature's relationship to another element(s) or feature(s) as illustrated in the figures. It will be understood that the spatially relative terms are intended to encompass different orientations of the device in use or in operation, in addition to the orientation depicted in the figures. For example, if the device in the figures is turned over, elements described as "below" or "beneath" or "under" other elements or features would then be oriented "above" the other elements or features. Thus, the example terms "below" and "under" can encompass both an orientation of above and below. The device may be otherwise oriented (e.g., rotated 90 degrees or at other orientations) and the spatially relative descriptors used herein should be interpreted accordingly.

It will be understood that, although the terms "first," "second," "third," etc., may be used herein to describe various elements, components, regions, layers and/or sections, these elements, components, regions, layers and/or sections should not be limited by these terms. These terms are used to distinguish one element, component, region, layer or section from another element, component, region, layer or section. Thus, a first element, component, region, layer or section described below could be termed a second element, component, region, layer or section, without departing from the spirit and scope of the present invention.

It will be understood that when an element or layer is referred to as being "on," "connected to," or "coupled to" another element or layer, it can be directly on, connected to, or coupled to the other element or layer, or one or more intervening elements or layers may be present. In addition, it will also be understood that when an element or layer is referred to as being "between" two elements or layers, it can be the only element or layer between the two elements or layers, or one or more intervening elements or layers may also be present.

The terminology used herein is for the purpose of describing particular embodiments and is not intended to be limiting of the present invention. As used herein, the singular forms "a" and "an" are intended to include the plural forms as well, unless the context clearly indicates otherwise. It will be further understood that the terms "comprises," "comprising," "includes," and "including," when used in this specification, specify the presence of the stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Expressions such as "at least one of," when preceding a list of elements, modify the entire list of elements and do not modify the individual elements of the list.

As used herein, the term "substantially," "about," and similar terms are used as terms of approximation and not as terms of degree, and are intended to account for the inherent variations in measured or calculated values that would be recognized by those of ordinary skill in the art. Further, the use of "may" when describing embodiments of the present invention refers to "one or more embodiments of the present invention." As used herein, the terms "use," "using," and "used" may be considered synonymous with the terms "utilize," "utilizing," and "utilized," respectively. Also, the term "exemplary" is intended to refer to an example or illustration.

The electronic or electric devices and/or any other relevant devices or components according to embodiments of the present invention described herein may be implemented utilizing any suitable hardware, firmware (e.g. an application-specific integrated circuit), software, or a combination of software, firmware, and hardware. For example, the various components of these devices may be formed on one integrated circuit (IC) chip or on separate IC chips. Further, the various components of these devices may be implemented on a flexible printed circuit film, a tape carrier package (TCP), a printed circuit board (PCB), or formed on one substrate. Further, the various components of these devices may be a process or thread, running on one or more processors, in one or more computing devices, executing computer program instructions and interacting with other system components for performing the various functionalities described herein. The computer program instructions are stored in a memory which may be implemented in a computing device using a standard memory device, such as, for example, a random access memory (RAM). The computer program instructions may also be stored in other non-transitory computer readable media such as, for example, a CD-ROM, flash drive, or the like. Also, a person of skill in the art should recognize that the functionality of various computing devices may be combined or integrated into a single computing device, or the functionality of a particular computing device may be distributed across one or more other computing devices without departing from the spirit and scope of the exemplary embodiments of the present invention.

Unless otherwise defined, all terms (including technical and scientific terms) used herein have the same meaning as commonly understood by one of ordinary skill in the art to which the present invention belongs. It will be further understood that terms, such as those defined in commonly used dictionaries, should be interpreted as having a meaning that is consistent with their meaning in the context of the relevant art and/or the present specification, and should not be interpreted in an idealized or overly formal sense, unless expressly so defined herein.

While the present invention has been particularly shown and described with reference to exemplary embodiments thereof, it will be understood by those of ordinary skill in the art that various changes in form and details may be made therein without departing from the spirit and scope of the present invention as defined by the following claims, and their equivalents.

What is claimed is:

1. A battery pack comprising:
   a battery comprising at least one battery cell;
   a power line communicator connected to a current path of the battery to detect a first data signal that is on the current path, that is output from a master communicator coupled to multiple batteries, that flows along the current path via the battery, and that comprises a data signal corresponding to a location of the battery or a control signal for the battery, and connected in parallel to the battery such that a first terminal of the power line communicator is connected to a first terminal of the battery, and a second terminal of the power line communicator is connected to a second terminal of the battery; and
   a battery management system (BMS) configured to receive the first data signal from the power line communicator, and to control the battery according to the first data signal.

2. The battery pack of claim 1, wherein the first data signal comprises:
   the data signal corresponding to the location of the battery; and
   the control signal for the battery.

3. The battery pack of claim 1, wherein the battery is connected to the power line communicator in parallel via the current path.

4. The battery pack of claim 1, wherein the BMS is configured to communicate with the power line communicator via a Serial Peripheral Interface (SPI).

5. The battery pack of claim 1, wherein the BMS is configured to monitor a state of the battery, and to transmit information corresponding to the state of the battery to the power line communicator.

6. The battery pack of claim 5, wherein the power line communicator is configured to output, to the current path, a second data signal including the information corresponding to the state of the battery received from the BMS.

7. The battery pack of claim 5, wherein the information corresponding to the state of the battery comprises information corresponding to a state of charge (SOC), a voltage, a current, and/or a temperature of the at least one battery cell.

8. An energy storage system (ESS) comprising:
   a plurality of battery packs connected to each other in series;
   a master communicator configured to output a first data signal via a current path along the plurality of battery packs; and
   a controller configured to control the master communicator to output the first data signal,
   wherein each of the plurality of battery packs comprises:
      a battery comprising at least one battery cell;
      a slave communicator connected to the current path of the battery to detect the first data signal that is on the current path, that is output by the master communicator, that flows along the current path via the battery, and that comprises a data signal corresponding to a location of the battery or a control signal for the battery, and connected in parallel to the battery such that a first terminal of the slave communicator is connected to a first terminal of the battery, and a second terminal of the slave communicator is connected to a second terminal of the battery; and
      a battery management system (BMS) configured to receive the first data signal from the slave communicator, and to control an operation of the battery according to the first data signal.

9. The ESS of claim 8, wherein the first data signal comprises:
   the data signal corresponding to the location of the battery; and
   the control signal for the battery.

10. The ESS of claim 8, wherein the battery is connected to the slave communicator in parallel via the current path.

11. The ESS of claim 8, wherein the BMS is configured to communicate with the slave communicator via a Serial Peripheral Interface (SPI).

12. The ESS of claim 8, wherein the BMS is configured to monitor a state of the battery, and to transmit information corresponding to the state of the battery to the slave communicator.

13. The ESS of claim 12, wherein the slave communicator is configured to output, to the current path, a second data signal including the information corresponding to the state of the battery received from the BMS.

14. The ESS of claim 13, wherein the master communicator is configured to receive the second data signal, and to transmit the second data signal to the controller.

15. The ESS of claim 12, wherein the information corresponding to the state of the battery comprises information corresponding to a state of charge (SOC), a voltage, a current, and/or a temperature of the at least one battery cell.

* * * * *